United States Patent
Merg

(10) Patent No.: US 9,201,930 B1
(45) Date of Patent: Dec. 1, 2015

(54) METHODS AND SYSTEMS FOR PROVIDING AN AUTO-GENERATED REPAIR-HINT TO A VEHICLE REPAIR TOOL

(71) Applicant: Snap-on Incorporated, Kenosha, WI (US)

(72) Inventor: Patrick S. Merg, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/270,994

(22) Filed: May 6, 2014

(51) Int. Cl.
*G06F 17/30* (2006.01)
*G07C 5/00* (2006.01)

(52) U.S. Cl.
CPC ...... *G06F 17/3053* (2013.01); *G06F 17/30864* (2013.01); *G07C 5/00* (2013.01); *G07C 5/006* (2013.01)

(58) Field of Classification Search
None
See application file for complete search history.

(56) References Cited

U.S. PATENT DOCUMENTS

| | | | |
|---|---|---|---|
| 4,258,421 A | | 3/1981 | Juhzsz et al. |
| 5,299,550 A | | 4/1994 | Inoue |
| 5,520,160 A | | 5/1996 | Aota et al. |
| 6,263,322 B1 | | 7/2001 | Kirkevold et al. |
| 6,370,454 B1 * | | 4/2002 | Moore ........................ 701/29.4 |
| 6,768,935 B1 | | 7/2004 | Morgan et al. |
| 6,823,258 B2 | | 11/2004 | Ukai et al. |
| 6,845,307 B2 | | 1/2005 | Rother |
| 6,850,071 B1 | | 2/2005 | Pederson et al. |
| 7,020,620 B1 * | | 3/2006 | Bargnes et al. .............. 705/7.24 |
| 7,092,937 B2 | | 8/2006 | Morgan et al. |
| 7,127,455 B2 * | | 10/2006 | Carson et al. ........................ 1/1 |
| 7,487,035 B2 | | 2/2009 | Nozawa et al. |
| 7,536,457 B2 | | 5/2009 | Miller |
| 7,542,832 B2 | | 6/2009 | Nou |

(Continued)

FOREIGN PATENT DOCUMENTS

| EP | 1569176 | 8/2005 |
|---|---|---|
| WO | 02/17118 A2 | 2/2002 |

(Continued)

OTHER PUBLICATIONS

Muller, Tobias Carsten; et al.; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

(Continued)

*Primary Examiner* — Calvin Cheung
(74) *Attorney, Agent, or Firm* — McDonnell Boehnen Hulbert & Berghoff LLP

(57) ABSTRACT

Methods and systems pertaining to auto-generated repair-hints are described. A processor can compare terms identified on a repair order (RO) to a taxonomy term database to determine standard terms associated with the terms on the RO, to store the standard terms as meta-data associated with the RO, to select pre-drafted text strings with gaps, and to insert the meta-data into the text string gaps to create a complete text string that forms at least part of an auto-generated repair-hint. The processor can receive a set of standard search terms to search for the auto-generated repair-hint from among multiple repair-hints. The processor can cause the auto-generated repair-hint to be transmitted to a vehicle repair tool for displaying the auto-generated repair-hint. A machine including the processor can receive a set of non-standard search terms (NSST) and identify a set of standard search terms associated with the NSST.

24 Claims, 7 Drawing Sheets

(56) References Cited

U.S. PATENT DOCUMENTS

| | | | |
|---|---|---|---|
| 7,801,671 B1 | 9/2010 | Pederson et al. | |
| 7,973,653 B2* | 7/2011 | Adachi | 340/438 |
| 8,095,261 B2 | 1/2012 | Howell et al. | |
| 8,140,358 B1 | 3/2012 | Ling et al. | |
| 8,285,439 B2 | 10/2012 | Hodges | |
| 8,868,288 B2 | 10/2014 | Plante et al. | |
| 8,892,451 B2 | 11/2014 | Everett et al. | |
| 8,924,240 B2 | 12/2014 | Depura et al. | |
| 2002/0007237 A1 | 1/2002 | Phung et al. | |
| 2002/0059156 A1 | 5/2002 | Hwang et al. | |
| 2002/0138185 A1 | 9/2002 | Trsar et al. | |
| 2002/0152115 A1 | 10/2002 | Morita et al. | |
| 2003/0004624 A1 | 1/2003 | Wilson et al. | |
| 2003/0195681 A1 | 10/2003 | Rother | |
| 2004/0176885 A1 | 9/2004 | Quinn | |
| 2005/0085964 A1 | 4/2005 | Knapp et al. | |
| 2005/0149566 A1 | 7/2005 | Baek et al. | |
| 2005/0171661 A1* | 8/2005 | Abdel-Malek et al. | 701/33 |
| 2005/0251450 A1* | 11/2005 | Koether et al. | 705/15 |
| 2005/0273218 A1* | 12/2005 | Breed et al. | 701/2 |
| 2006/0095230 A1 | 5/2006 | Grier et al. | |
| 2006/0101074 A1* | 5/2006 | Cancilla et al. | 707/104.1 |
| 2006/0106797 A1 | 5/2006 | Srinivasa et al. | |
| 2007/0043487 A1 | 2/2007 | Krzystofczyk et al. | |
| 2007/0124040 A1* | 5/2007 | Chen | 701/33 |
| 2008/0004764 A1 | 1/2008 | Chinnadurai et al. | |
| 2008/0040268 A1 | 2/2008 | Corn | |
| 2008/0110239 A1 | 5/2008 | Maegawa | |
| 2009/0055045 A1* | 2/2009 | Biswas et al. | 701/33 |
| 2009/0062977 A1 | 3/2009 | Brighenti | |
| 2009/0295559 A1 | 12/2009 | Howell et al. | |
| 2010/0023203 A1* | 1/2010 | Shibi | 701/33 |
| 2010/0063668 A1 | 3/2010 | Zhang et al. | |
| 2010/0152962 A1* | 6/2010 | Bennett et al. | 701/33 |
| 2011/0118905 A1 | 5/2011 | Mylaraswamy et al. | |
| 2011/0118934 A1* | 5/2011 | Lowrey et al. | 701/33 |
| 2011/0172874 A1 | 7/2011 | Patnaik et al. | |
| 2011/0238258 A1 | 9/2011 | Singh et al. | |
| 2011/0270706 A1 | 11/2011 | Anspach et al. | |
| 2011/0279283 A1 | 11/2011 | Corn | |
| 2012/0215491 A1 | 8/2012 | Theriot et al. | |
| 2012/0245791 A1 | 9/2012 | Yun et al. | |
| 2012/0303205 A1 | 11/2012 | Subramania et al. | |
| 2013/0304306 A1 | 11/2013 | Selkirk et al. | |
| 2013/0325541 A1 | 12/2013 | Capriotti et al. | |
| 2014/0121888 A1 | 5/2014 | Guo et al. | |
| 2014/0207771 A1 | 7/2014 | Merg | |

FOREIGN PATENT DOCUMENTS

| | | |
|---|---|---|
| WO | 2004092918 A2 | 10/2004 |
| WO | 2013063232 A1 | 5/2013 |
| WO | 2014001799 A1 | 1/2014 |

OTHER PUBLICATIONS

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

U.S. Appl. No. 14/260,929, filed Apr. 24, 2014, 79 pages.

Sankavaram, Chaitanya et al, "Event-driven Data Mining Techniques for Automotive Fault Diagnosis," 21st International Workshop on Principles of Diagnosis, pp. 1-8 (Oct. 13-16, 2010).

Auterra, LLC, "DashDyno SPD Automotive Computer", last visited Feb. 21, 2011, available at http://www.auterraweb.com/, 1 page.

Deal Extreme.Com, "ELM327 Bluetooth OBD-11 Transceiver Dongle", Oct. 22, 2008, available at http://www/dealextream.com/p/elm327-bluetooth-obd-il-wireless-transceiver-dongle-16921 (last visited Feb. 21, 2011), 5 pages.

Automotive Test Solutions, Inc. "EScan-Automotive Test Solutions", 2006, available at http://atsnm.com/escan.htm (last visited Feb. 21, 2011), 6 pages.

A.K. Jain et al, "Statistical Pattern Recognition: A Review", IEEE Transactions on Pattern Analysis and Machine Inteliegence, vol. 22, No. 1. Jan. 2000, pp. 4-37.

K. Layne, "Reading a Vacuum Gauge", Motor, Aug. 2001, pp. 47-50, available at http://www.motor.com/magazine/pdfs/082001_05.pdf (last visited Feb. 21, 2011).

Snap-on Inc., "VERDICT user Manual", EAZ0063L05A Rev. A, Aug. 2010, 149 pages.

Wikipedia, "Expert System", Oct. 5, 2010, available at http://en.wikipedia.org/wiki/Expert_system (last visited Oct. 6, 2010), 7 pages.

Wikipedia, "Inference Engine", Jun. 21, 2010, available at http://en.wikipedia.org/wiki/Inference_engine (last visited Oct. 6, 2010), 2 pages.

Wikipedia, "Pearson product-moment correlation coefficient", Feb. 18, 2011, available at http://en.wikipedia.org/wiki/Pearson_product-moment_correlation_coefficient (last visited Feb. 21, 2011), 6 pages.

U.S. Appl. No. 13/963,403, filed Aug. 9, 2013, 43 pages.

Oracle Corporation, "Application Architecture", Oracle Database Concepts, 11 g Release 1(11.1) available at http://docs.oracle.com/cd/B28359 01/server.111/b28318/dist pro.htm (last visited Dec. 19, 2013), 5 pages.

U.S. Appl. No. 13/031,565, filed Feb. 21, 2011, 85 pages.

International Searching Authority at European Patent Office, International Search Report (PCT Article 18 and Rules 43 and 44) regarding international application No. PCT/US2015/029327, mailing date of report Jul. 8, 2015, 3 pages.

International Searching Authority at European Patent Office, Written Opinion of the International Searching Authority (PCT Rule 43bis.1) regarding international application No. PCT/US2015/029327, mailing date of report Jul. 8, 2015, 6 pages.

The Stanford Natural Language Processing Group, the Stanford natural language processing group, downloaded from the World Wide Web at http://nlp.stanford.edu/software/index.shtml on Oct. 17, 2014, 3 pages.

The Stanford Natural Language Processing Group, Stanford CoreNLP, downloaded from the World Wide Web at http://nlp/stanford.edu/software/corenlp.shtml on Oct. 17, 2014, 8 pages.

Consortium on Conginitive Science Instruction; Introduction to natural language processing, downloaded from the World Wide Web at http://www.mind.ilstu.edu/curriculum/protothinker/nuatural_language_processing.php on Oct. 21, 2013, 32 pages.

Dickinson, Marcus; Linguistics 362: Introduction to Natural Language Processing; Jul. 1, 2012; 48 pages.

* cited by examiner

| | |
|---|---|
| RO ID: 3915   Repair year 2009 Y/M/M/E: 1997/Ford/Crown Victoria/4.6L, V8, VIN (W) | |
| Work Requested: Customer states the vehicle has failed state emissions certification. Please diagnose and advise.  Customer states please replace the MAF sensor.  608 | |
| Work Performed: Technician scan tested and verified the DTC P0171 and DTC P0174. Tested for vacuum leaks and found none at the time.  Tested the fuel pump pressure found [[30]] PSI and [[40]] PSI unregulated.  Checked the scan data.  Found the MAF sensor readings incorrectly.  Removed the MAF sensor and cleaned.  Found the MAF sensor is damaged.  Recommend a new MAF sensor and clear the DTCs and retest. Removed the old MAF sensor.  Installed a new MAF sensor.  Cleared the DTCs and road tested fine at the time.   610 | |
| Meta-data: Customer complaint: failed state emissions certification
Pcode: P0171, P0174
Component: mass airflow sensor (MAF) (MAF sensor)   612 | |
| Usage indicator: Distance = 23,411 miles   614 | |

FIG. 6

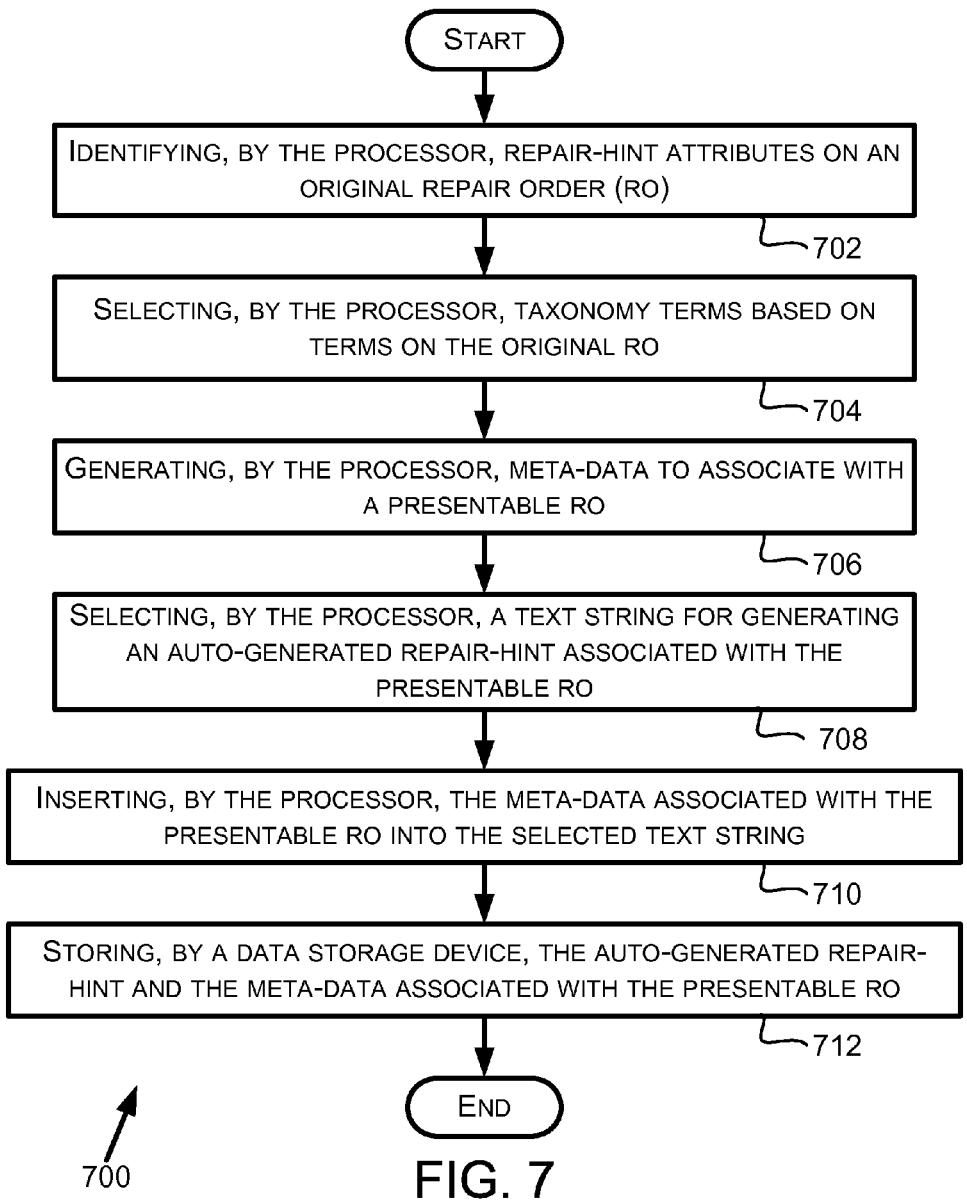

METHODS AND SYSTEMS FOR PROVIDING AN AUTO-GENERATED REPAIR-HINT TO A VEHICLE REPAIR TOOL

BACKGROUND

Many products produced by manufacturers occasionally have to be repaired. Many owners are unequipped or otherwise unable to repair certain products. Such owners may depend on professional repair technicians to service or repair the owner's product.

The repair technicians typically repair products at a product repair shop. A repair shop has traditionally produced a repair order (RO) to capture a variety of information regarding a request for servicing or repairing a product. As an example, the captured information can include information identifying the product, the product's owner, the repair shop, the date of repair, and the type of repair or service needed or performed. The RO can exist in various formats such as a paper format or an electronic format.

Product manufacturers use a significant amount of resources (e.g., human and financial) to generate repair information, such as repair manuals and technical service bulletins, that repair technicians can reference while diagnosing and repairing a product. It may be beneficial to product manufacturers if the repair information can be generated automatically by a computer-readable device. It may be beneficial to product manufacturers and repair technicians if the repair information provided to the repair technicians is automatically generated based on RO information.

OVERVIEW

Example embodiments are described herein. In a first aspect of this description, one or more example embodiments can be arranged as a method comprising: (i) receiving, by a processor, a first set of search terms for selecting, from a non-transitory data storage device storing a plurality of repair-hints, an auto-generated repair-hint for providing to a vehicle repair tool, wherein each auto-generated repair-hint stored in the data storage device includes meta-data that is associated with at least one set of search terms and the meta-data is generated based on computer-readable repair-order data and computer-readable taxonomy terms within a taxonomy term database, (ii) selecting, by the processor from among the plurality of repair-hints and based on the first set of search terms, an auto-generated repair-hint associated with the first set of search terms, and (iii) providing, by the processor, the selected auto-generated repair-hint to a communication network for transmission of the selected auto-generated repair-hint to the vehicle repair tool.

A related feature of the first aspect includes the selected auto-generated repair-hint including multiple auto-generated repair-hints, and selecting each auto-generated repair-hint of the multiple auto-generated repair-hints includes selecting the auto-generated repair-hint based on a quantity of computer-readable repair orders associated with the auto-generated repair-hint.

A related feature of the first aspect includes providing, by the processor, data that indicates a ranking of the multiple auto-generated repair-hints to the communication network for transmission of the data to the vehicle repair tool, and the ranking data indicates, for each selected auto-generated repair-hint, a probability of an occurrence of a vehicle symptom associated with the each selected auto-generated repair-hint.

A related feature of the first aspect includes storing, by the data storage device, the taxonomy term database and computer-readable program instructions, and the computer-readable program instructions including program instructions executable by the processor to generate, for each auto-generated repair-hint and based on computer-readable repair orders stored by the data storage device, the meta-data associated with the at least one set of search terms, the taxonomy term database including a plurality of taxonomy terms for comparison to terms on the computer-readable repairs orders, and at least a portion of the meta-data associated with the at least one set of search terms for each auto-generated repair-hint including a taxonomy term selected from the taxonomy term database.

A related feature of the first aspect includes storing, by the data storage device, text strings having gaps for inserting the meta-data that is associated with the at least one set of search terms, selecting, by the processor, at least one text string associated with the first set of search terms, inserting, by processor, the meta-data of the selected auto-generated repair-hint into the selected at least one text string associated with the first set of search terms, and selecting the auto-generated repair-hint includes selecting the at least one text string associated with the first set of search terms and the inserted meta-data.

A related feature of the first aspect includes storing, by the data storage device, a plurality of vehicle-year-make-model attribute combinations and a plurality of symptom-criterions, wherein the first set of search terms includes (i) a first vehicle-year-make-model attribute combination among the plurality of vehicle-year-make-model attribute combinations, and (ii) a first symptom-criterion among the plurality of symptom-criterions, and each set of search terms associated with the meta-data of a repair-hint includes a vehicle-year-make-model attribute combination among the plurality of vehicle-year-make-model attribute combinations and a symptom-criterion among the plurality of symptom-criterions.

A related feature of the first aspect includes providing, by the processor, at least one statistic associated with the selected auto-generated repair-hint to the communication network for transmission of the at least one statistic to the vehicle repair tool.

A related feature of the first aspect includes the at least one statistic associated with the selected auto-generated repair-hint is based on a ratio of a number of computer-readable repair orders associated with the first set of search terms and a number of computer-readable repair orders associated with the first vehicle-year-make-model attribute combination.

A related feature of the first aspect includes the at least one statistic associated with the selected auto-generated repair-hint pertaining to geographical locations at which computer-readable repair orders associated with the first set of search terms were produced.

A related feature of the first aspect includes at least one vehicle-year-make-model attribute combination including a vehicle-year-make-model-submodel-engine attribute combination.

A related feature of the first aspect includes the auto-generated repair-hint associated with the first set of search terms including computer-readable data identifying a way to stop a vehicle component from rattling.

A related feature of the first aspect includes generating, by the processor, the selected auto-generated repair-hint.

A related feature of the first aspect includes at least one repair-hint of the plurality of repair-hints including meta-data associated with at least two sets of search terms.

A related feature of the first aspect includes providing, by the processor to the communication network for transmission to the vehicle repair tool, a pick list from which at least a portion of the first set of search terms can be selected, and receiving the first set of search terms includes receiving the at least a portion of the first set of search terms selected from the pick list.

A related feature of the first aspect includes receiving, by the data storage device, data for modifying the taxonomy term database based on a human reviewing at least a portion of the taxonomy term database.

A related feature of the first aspect includes storing, by the data storage device, a plurality of vehicle-year-make-model-system attribute combinations and a plurality of symptom-criterions, wherein the first set of search terms includes (i) a first vehicle-year-make-model-system attribute combination among the plurality of vehicle-year-make-model-system attribute combinations, and (ii) a first symptom-criterion among the plurality of symptom-criterions, and each set of search terms associated with the meta-data of a repair-hint includes a vehicle-year-make-model-system attribute combination among the plurality of vehicle-year-make-model-system attribute combinations and a symptom-criterion among the plurality of symptom-criterions.

A related feature of the first aspect includes generating, by the processor, the selected auto-generated repair-hint and receiving, by the processor, a vehicle-usage indicator, and selecting the auto-generated repair-hint is conditioned on the received vehicle-usage indicator, and generating the selected auto-generated repair-hint is based on a set of computer-repair orders including first repair order data that matches the first set of search terms and second repair order data that matches or is within a range associated with the received vehicle usage indicator.

A related feature of the first aspect includes the vehicle-usage indicator indicating a distance, a distance range, an amount of time, an amount of time range, a number of engine-starts, an engine-starts range, a number of vehicle-drives, or a vehicle-drives range.

A related feature of the first aspect includes accessing, by the processor, leverage data to add at least one additional search term, based on leverage data associated with at least a portion of the first set of search terms, to the first set of search terms, and selecting the auto-generated repair-hint associated with the first set of search terms includes selecting the auto-generated repair-hint associated with the first set of search terms including the at least one additional search term.

In a second aspect of this description, one or more example embodiments can be arranged as a machine comprising: (i) a non-transitory data storage device storing a plurality of auto-generated repair-hints, wherein each auto-generated repair-hint stored in the data storage device includes meta-data that is associated with at least one set of search terms and the meta-data is generated based on computer-readable repair-order data and computer-readable taxonomy terms within a taxonomy term database, (ii) a processor configured to receive a first set of search terms for selecting, from the data storage device, an auto-generated repair-hint for providing to a vehicle repair tool, and (iii) a network interface configured to transmit the auto-generated repair-hint selected by the processor to a communication network for transmission of the selected auto-generated repair-hint to the vehicle repair tool.

In a third aspect of this description, one or more example embodiments can be arranged as a machine comprising: (i) a non-transitory data storage device storing computer-readable program instructions, (ii) a processor configured to execute the program instructions stored in the data storage device to generate a repair-hint request including a set of search terms, (iii) a network interface configured to transmit over a communication network the repair-hint request including the set of search terms and to receive an auto-generated repair-hint that includes meta-data that is associated with at the set of search terms and the meta-data is generated based on computer-readable repair-order data and computer-readable taxonomy terms within a taxonomy term database, and (iv) a display device to display the auto-generated repair-hint received by the network interface.

The features listed above as being related features of embodiments of the first aspect of the description, are equally applicable to embodiments of the second and third aspects of this description.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 6 shows a repair order including auto-generated repair-hint and meta-data.

FIG. 7 is a flowchart depicting a set of functions that can be carried out in accordance with one or more example embodiments.

DETAILED DESCRIPTION

I. Introduction

Figure 1:
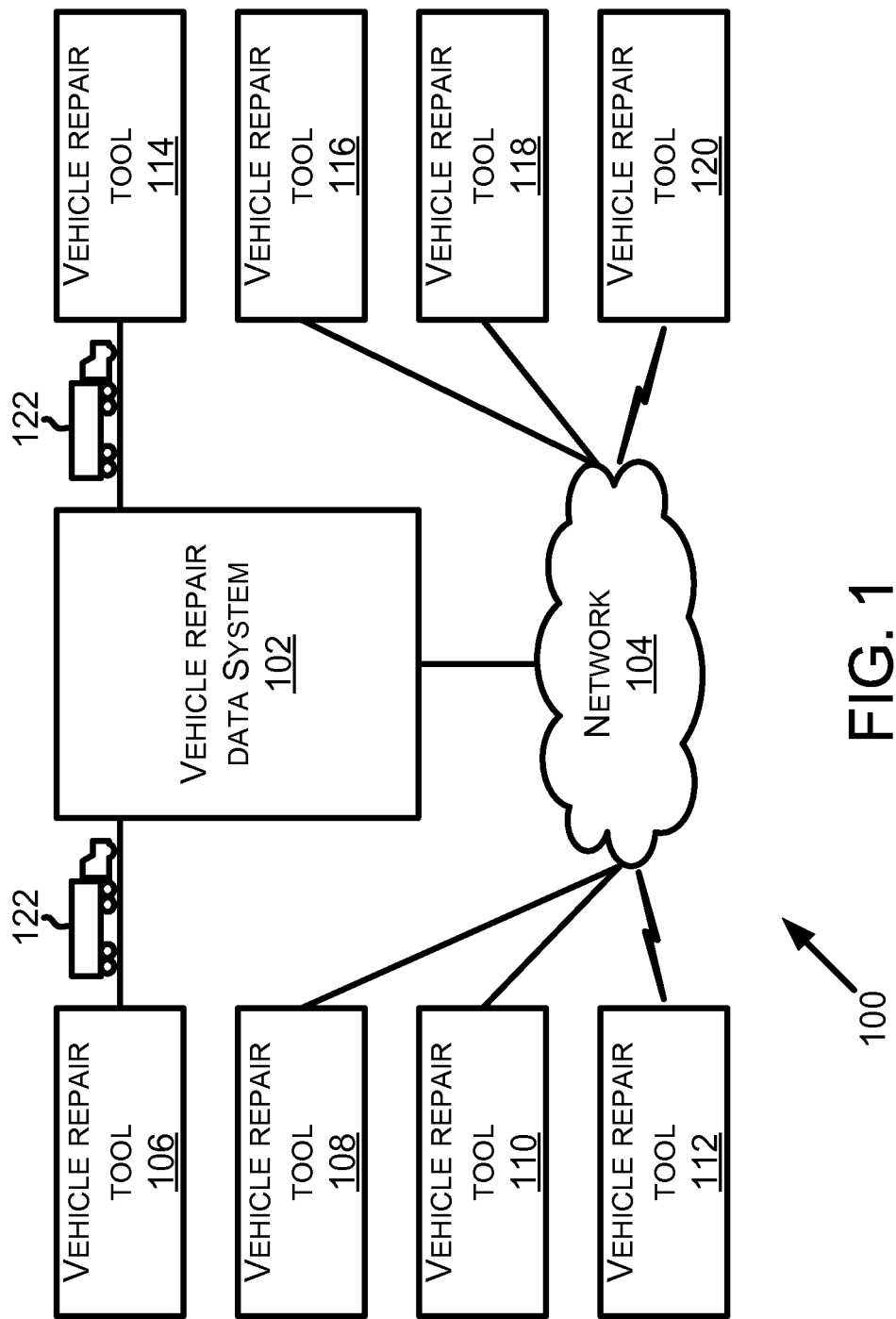
FIG. 1 is a block diagram of a system in accordance with one or more example embodiments.

This description describes several example embodiments including example embodiments regarding auto-generated repair-hints. At least some of the example embodiments include, but are not limited to include, one or more of the following features: generating an auto-generated repair-hint, selecting an auto-generated repair-hint associated with a set of search terms, and providing an auto-generated repair-hint to a communication network for transmission to a vehicle repair tool. As an example, a processor, executing computer-readable program instructions, can generate an auto-generated repair-hint based on an original repair order, taxonomy terms in a taxonomy term database, meta-data, and text strings. An auto-generated repair-hint can be provided to a vehicle repair tool for display by the vehicle repair tool before any human reads or reviews the auto-generated repair-hint.

A vehicle repair tool can include any of a variety of repair tools a repair technician, a product owner, a person working at a repair shop, or some other person can use to repair a vehicle.

Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a vehicle diagnostic tool, a vehicle service tool, a vehicle maintenance tool, and a vehicle repair verification tool, or more generally, a machine.

For purposes of this description, a vehicle can include an automobile, a motorcycle, a semi-tractor, a light-duty truck, a medium-duty truck, a heavy-duty truck, a farm machine, a boat, a ship, a generator, an airplane, or some other type of vehicle. A vehicle can include or use any appropriate voltage or current source, such as a battery, an alternator, a fuel cell, and the like, providing any appropriate current or any appropriate voltage, such as about 12 volts, about 42 volts, and the like. A vehicle can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. The example embodiments can carry out a variety of functions, including functions for repairing, diagnosing, servicing or maintaining a vehicle.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements or a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a vehicle repair data (VRD) system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes a vehicle repair tool (VRT) 106, and VRT 108, 110, 112, 114, 116, 118, and 120. Each VRT or a combination of multiple VRT is a machine. Any VRT described herein can be, but is not required to be, configured to generate or transmit an original repair order (RO) to VRD system 102. An RO generated by a VRT can be provided to an operator of VRD system 102 by a courier 122, such as the United States Postal Service or the Federal Express Corporation. The operator of VRD system 102 can enter an original RO into VRD system 102 using an RO manual entry device, such as an RO manual entry device 202 shown in FIG. 2. The manually-entered RO can be stored in a data storage device, such as a data storage device 210 shown in FIG. 2.

VRT 114, 116, 118, and 120 represent vehicle repair tools that are configured to perform at least one of the following functions: request a repair-hint (e.g., an auto-generated repair hint) stored at VRD system 102, receive a repair-hint transmitted from VRD system 102 using network 104 or otherwise provided or generated by VRD system 102, and present a repair-hint by a user interface. A repair-hint generated by VRD system 102 can be provided to an operator of a VRT, such as VRT 114, by courier 122. As an example, courier 122 can provide the repair-hint by providing the VRT operator with a computer-readable medium, such as a CD-ROM, including a repair-hint generated by VRD system 102. VRT 116, 118, and 120 can receive a repair-hint generated by VRD system 102 and transmitted to the VRT using wireless or wired communications and network 104.

A VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code. Data encoded from a code can be entered onto an original RO, such as original RO 400 shown in FIG. 4.

Figure 2:
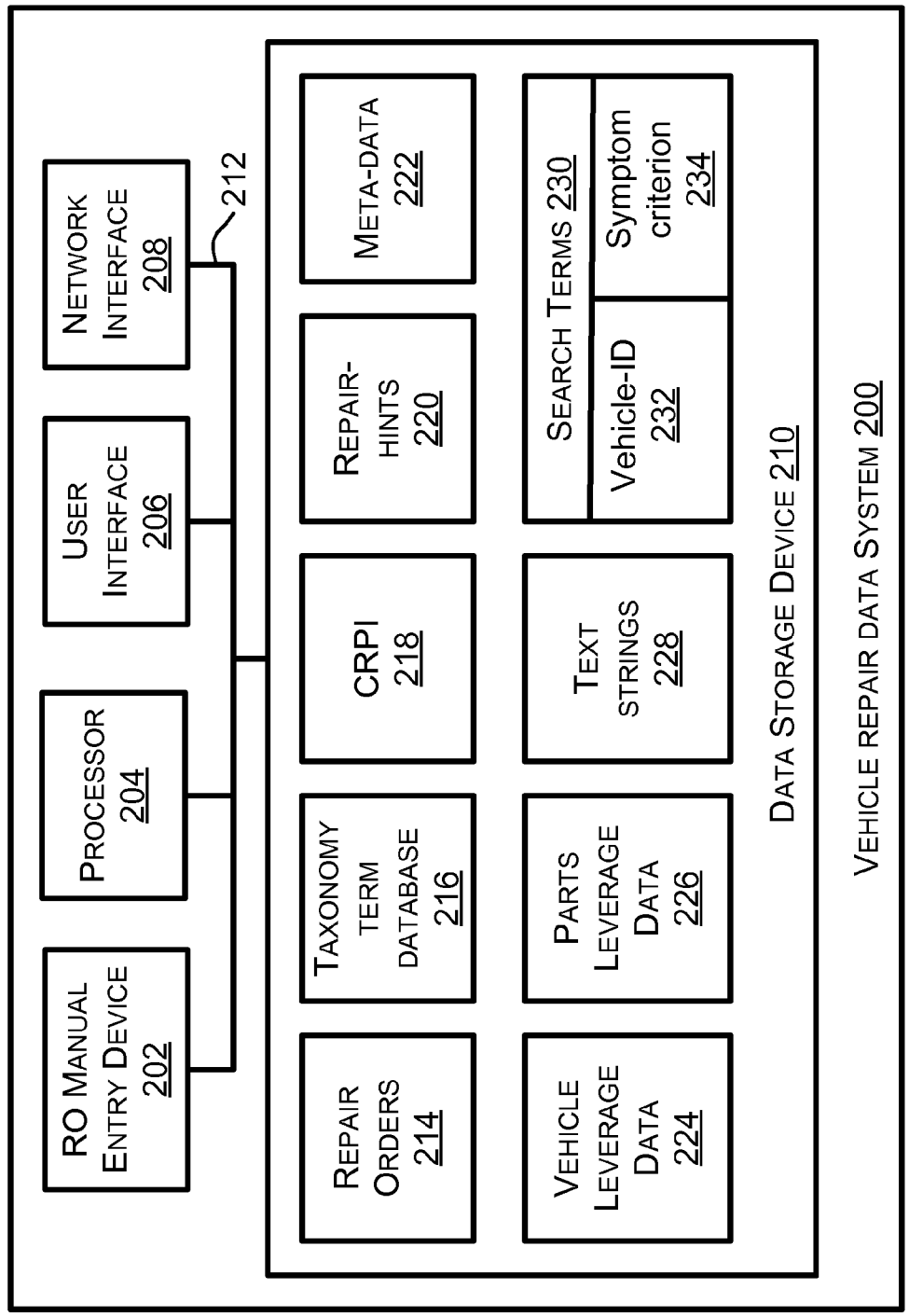
FIG. 2 is a block diagram of a vehicle repair data (VRD) system in accordance with one or more example embodiments.

Next, FIG. 2 is a block diagram showing details of a vehicle repair data (VRD) system 200. VRD system 102, shown in FIG. 1, can be configured similar to VRD system 200. VRD system 200 can be configured like VRD system 102 shown in FIG. 1. VRD system 200 is a machine. VRD system 200 can comprise, be configured as, or be referred to as a server system, a server device, or more simply, a server. In accordance with embodiments in which VRD system 200 operates as a server, VRD system 200 can serve one or more vehicle repair tools (VRT) operating as a client device to the server.

VRD system 200 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into VRD system 200 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, VRD system 102 can be configured such that an original RO generated by a first VRT, such as VRT 106, is not provided to a second VRT, such as VRT 116. VRD system 102 can generate a presentable RO based, at least in part, on information on the original RO generated by the VRT 106, and provide the presentable RO to VRT 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times.

User interface 206 can include an interface to components operable to enter data or information into VRD system 200 or to components that can present data or information output by VRD system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into VRD system 200 or to present data or information output by user interface 206.

User interface 206 can include a transmitter or transceiver to provide the data or information to another user interface component or to another element of VRD system 200. The data or information provided by user interface 206 can include, but is not limited to include, a repair-hint of repair-hints 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as data storage device 210, can include a non-transitory computer-readable storage medium readable by processor 204. In an alternative arrangement, data storage device 210 can include two or more non-transitory computer-readable storage mediums. Each non-transitory computer-readable storage medium can include volatile or non-volatile storage components, such as optical, magnetic, organic or other memory or disc storage, which can be integrated in whole or in part with a processor, such as processor 204.

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair hints 220, meta-data 222, vehicle leverage data 224, parts leverage data 226, text strings 228, and search terms 230. Search terms 230 can include, but is not limited to, vehicle-identification (i.e., vehicle-ID) search terms 232, such as year/make/model/engine (Y/M/M/E) attributes, and symptom criterion 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a VRT shown in FIG. 1 or entered using RO manual entry device 202, or a presentable RO generated by VRD system 200.

Figure 4:
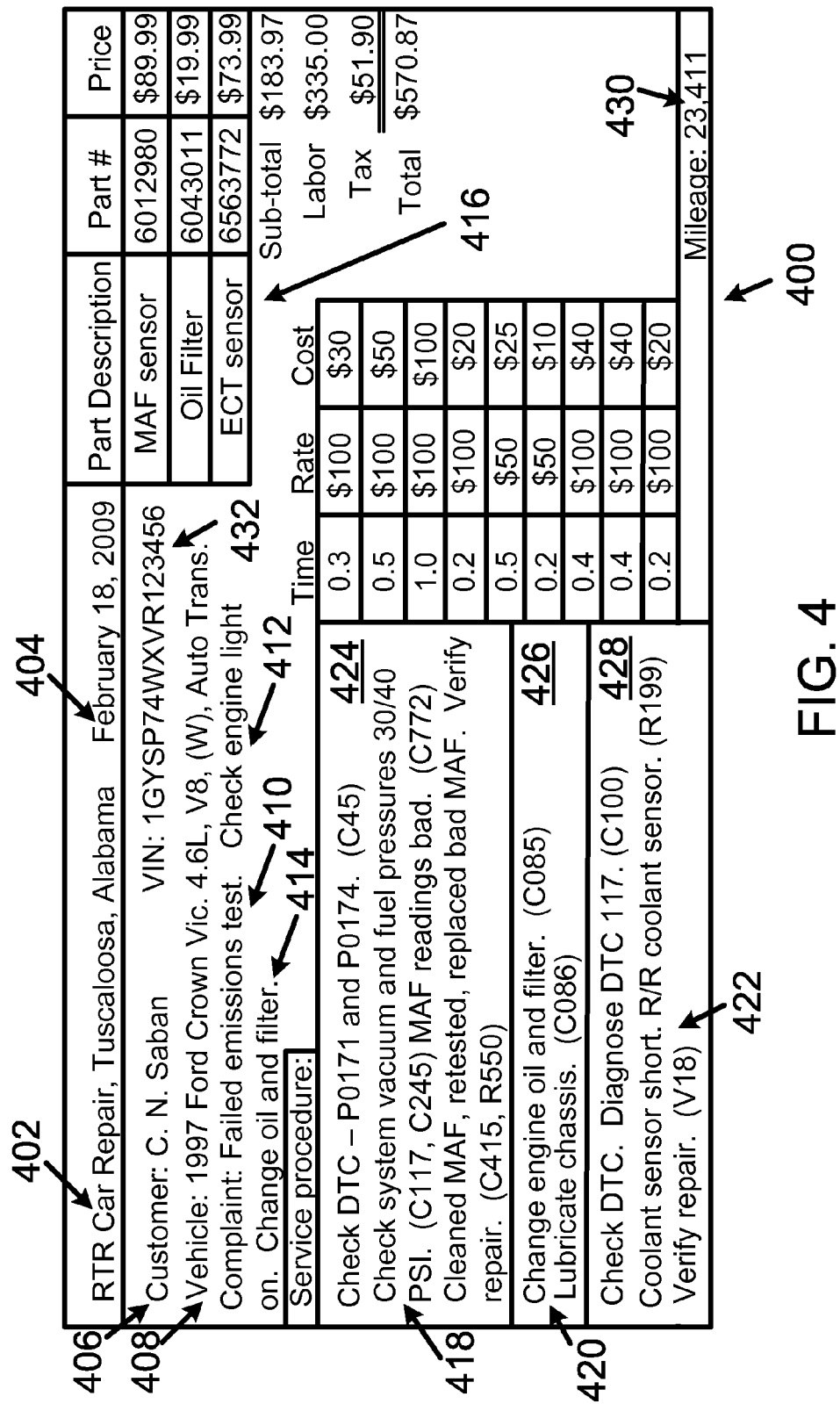
FIG. 4 shows a repair order in accordance with one or more example embodiments.

FIG. 4 shows an example original RO 400. Original RO 400 can be generated by a VRT, such as any VRT shown in FIG. 1. Original RO 400 can include a computer-readable-data RO (or more simply, computer-readable RO) transmitted over network 104. Original RO 400 can include a paper-copy RO, such as carbonless multi-sheet RO or some other type of paper-copy RO. Original RO 400 can include both a computer-readable-data version and a paper-copy version. A paper-copy RO can be generated without using a VRT. A computer-readable RO generated from a paper-copy RO can be an original RO.

Original RO 400 includes a service provider identifier 402, a date of service identifier 404, a customer indicator 406 that indicates a customer seeking service of a given vehicle, vehicle information 408 that indicates the given vehicle, vehicle service requests 410, 412, and 414 indicating the complaint(s) or service(s) requested by the customer, parts information 416 indicating parts obtained for servicing the given vehicle, service procedure information 418, 420, and 422 carried out on the given vehicle, and a vehicle-usage indicator 430 (e.g., vehicle mileage data that indicates a number of miles the given vehicle has been driven). The vehicle-usage indicator 430 on original RO 400 can indicate a driven distance using kilometers or some other units as an alternative or in addition to vehicle mileage data. In addition to or as an alternative to indicating a distance, the vehicle-usage indicator 430 can include a time-used indicator such as an hours indicator indicating, for example, how long a vehicle or an engine has been used.

Service provider identifier 402 can include information that indicates a name and geographic location of the service provider. Vehicle information 408 can include a vehicle identification number (VIN) 432 associated with the given vehicle and a description of the given vehicle. Service procedure information 418, 420, and 422 can include information within distinct RO sections 424, 426, and 428, respectively, of original RO 400. The service procedure information within any one distinct RO section 424, 426, and 428 can be unrelated to the service procedure information with any other distinct section. Alternatively, two or more distinct sections including service procedure information can pertain to related service operations performed on the given vehicle.

Original RO 400 includes labor operation codes (LOCs). The LOCs can conform to those defined by a vehicle manufacturer, a service provider that generates an RO, a service information provider, such as Mitchell Repair Information, LLC, Poway, Calif., or some other entity. For simplicity of FIG. 4, the LOCs are shown within parenthesis, such as (C45) and (C117, C245). Distinct LOC within parenthesis are separate by a comma. Each labor operation code (LOC) can refer to a particular operation performed to the given vehicle. Processor 204, executing CRPI 218, can use a LOC to determine what type of service or repair operation was performed to the given vehicle. Using the LOC in that manner is helpful if other information regarding that operation is incomplete or described using non-standard phrases or terms. Processor 204 can also use LOC to determine context for the service procedure information on or within the RO.

Multiple portions of text on an RO, such as original RO 400, can be grouped as phrases. When comparing contents of an RO to various terms of taxonomy term database 216, such as mapping terms, standard terms, or context terms, words within a given proximity to one or more other words on original RO 400 can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is 4 word, the words "Check" and "ignition system" can be grouped as the phrase "Check ignition system" for comparison to mapping, standard, context terms, or labor operation codes.

The mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

RO 214 can include original RO 400 as a computer-readable version of original RO 400. RO 214 can include one or more other computer-readable RO arranged like original RO 400 and one or more other computer-readable RO arranged in an RO configuration that differs from original RO 400. The other RO configurations typically include at least one of the types of information described above as being a part of original RO 400.

An RO stored within RO 214, such as original RO 400 or another RO, can include searchable text or symbols (e.g., text, symbols, or text and symbols). As an example, a symbol on an RO can include an empty check box or a checkbox and a checkmark inside the checkbox. Original RO 400 can be modified to include a presentable RO 600 (shown in FIG. 6) that represents original RO 400 or data thereon. Additionally or alternatively, presentable RO 600 can be distinct and separate from original RO 400.

Processor 204 can search the text, symbols or other content on an RO of RO 214 or the meta-data associated with an RO to associate an RO within a cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214. Table 1 shows examples of DTC, Action, and component attributes associated with each respective RO cluster.

TABLE 1

| Cluster ID | Cluster Size | DTC | Action | Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |

TABLE 1-continued

| Cluster ID | Cluster Size | DTC | Action | Component(s) |
|---|---|---|---|---|
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Auto-generated repair-hints for those example customer complaint terms can include repair hints identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or VRD system 102. The RO data in Table 2 also includes year/make/model/engine attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | LS2 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E350 | 4.6 L, V8, VIN (6) |
| 1194 | 2002 | Ford | Pickup F150 | 4.2 L V6, VIN (2) |
| 8797 | 2006 | Ford | Crown Victoria LX | 4.6 L, V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair-hints based on a sub-model in addition to Y/M/M/E attributes can lead to search results having RO or repair-hints associated with a particular sub-model, but not the other sub-model(s) of a particular vehicle having particular Y/M/M/E attributes. The "S" within Y/M/M/S/E can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of attributes including a system attribute can be referred to as Y/M/M/E/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle part and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 70 RO or a single RO cluster for the 70 RO. A greater quantity of RO can indicate a greater likelihood of occurrence of a successful repair of a given problem arising from the coolant temperature sensor.

CRPI 218 can include program instructions executable by processor 204 to carry out functions described herein or performable by VRD system 200. CRPI 218 can include program instructions that are executable to parse data from an original RO stored within RO 214 and to identify the service procedure information, vehicle identification, and parts usage information from the original RO for use in generating a presentable RO or to increment a count of a cluster size if a presentable RO pertaining to the original RO has already been generated.

CRPI 218 can include program instructions executable by processor 204 to generate, for each auto-generated repair-hint and based on the RO stored in RO 214, meta-data associated with at least one set of search terms. Meta-data 222 can include meta-data generated by processor 204 based the information listed on original RO 400 including, but not limited to the LOC and a definition of the LOC.

CRPI 218 can include program instructions executable by processor 204 to determine that words or phrases within service procedure information, such as service procedure information 418, 420, or 422, are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

Text strings 228 can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair hint of repair hints 220. Processor 204 can select the meta-data to insert into the gap(s) of a text string. Text strings 228 can include text strings entered by user interface 206. Text strings 228 can include text strings received by network interface 208.

Search terms 230 can include various sets of search terms. A set of search terms can include vehicle-ID search terms 232 or a symptom criterion 234. A first example set of search terms can include search terms received by network interface 208 as part of a request for a repair hint. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair hint. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E attributes, defined in taxonomy term database 216 and standard symptom criterion defined in taxonomy term database 216. Processor 204 can associate one or more standard sets of search terms with a repair hint or a repair order. A set of search terms associated with a repair hint or repair order can be stored as meta-data associated with that repair hint or repair order. Taxonomy term database 216 can include search terms 230. The second example set of search terms 230 can be associated with one more sets of search terms like the first example set of search terms.

Table 5 shows an example of search terms that can be stored in search terms 230. NSST-227 is associated with SST-15. SST-15 is associated with RO ID 3915. Repair hint 610 on RO ID 3915 can be identified in response to receiving NSST-227, determining that SST-15 is associated with NSST-227, and determining RO ID 3915 is associated with SST-15. SST-1456 is a set of standard search terms having symptom criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Y/M/M/E | Symptom Criterion | Associations |
|---|---|---|---|
| NSST-227 | 97 Ford Crown Vic. 8 cyl. | Emissions and MAF failed. DTC P171 P174. | SST-15 |
| SST-15 | 1999/Ford/Crown Victoria/ 4.6 L V8 (W) | Pcode: P0171, P0174 Component: MAF sensor Work Requested: failed state emissions certification | RO ID 3915 NSST-227 |
| SST-1456 | 2000/Ford/Crown Victoria/ 4.6 L V8 (W) | Pcode: P0171, P0174 Component: MAF sensor Work Requested: failed state emissions certification | RO ID 3915 |

The vehicle-ID search terms 232 is one example of search terms that can be included within search terms 230. Vehicle-ID search terms 232 can include various selectable attributes. For example, the attributes of vehicle-ID search terms 232 can include Y/M/M/E attributes. As another example, the attributes of vehicle-ID search terms 232 can include Year/Make/Model/Sub-model/Engine (Y/M/M/S/E) attributes as discussed with respect to Table 2. As another example, the attributes of vehicle-ID search terms 232 can include Year/Make/Model/Engine/System (Y/M/M/E/Sys) attributes. As another example, the attributes of vehicle-ID search terms 232 can include Year/Make/Model/Sub-model/Engine/System (Y/M/M/S/E/Sys) attributes.

The system (Sys) attribute vehicle-ID search terms 232 can indicate or represent a system (e.g., one or more systems) or a component (e.g., one or more components) within a vehicle. As an example, the system or component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other system or component installed within, attached to, or other otherwise operating on or in the vehicle.

The order of any of the vehicle-ID search terms 232 described herein can be rearranged as desired. For example, the order of the Y/M/M/E attributes could be rearranged as Make/Model/Engine/Year (M/M/E/Y) attributes or in another arrangement.

FIG. 6 shows an example content of a presentable RO 600 including an RO identifier 602, RO timing information 604, RO vehicle identifier 606, a vehicle service request 608, an auto-generated repair-hint 610, meta-data 612, and a usage indicator 614. Presentable RO 600 is based service procedure information 418 an original RO 400. RO identifier 602 is "3915," which is also shown in the seventeenth row of Table 2. RO timing information 604 includes a year designator (i.e., 2009) to indicate a time that pertains to RO ID 3915. That time can indicate, for example, when original RO 400 was written, completed, or submitted to VRD system 102. RO timing information could include other or different time information such as a day, month, or hour-of-a-day. RO vehicle identifier 606 includes the year/make/model/engine attributes shown in the seventeenth row of Table 2 for RO ID 3915. Additional or other attributes of the given vehicle identified on original RO 400 can be included on presentable RO 600.

Presentable RO 600 includes elements in or based on original RO 400. Presentable RO 600 can be stored within data storage device 210 with or as part of original RO 400. Additionally or alternatively, presentable RO 600 can be stored separately and distinctly from original RO 400.

Vehicle service request 608 includes information pertaining to a vehicle service request on an RO within RO 214. Vehicle service request 608 can include one or more text strings from text strings 228. As an example, each sentence within vehicle service request 608 can be a separate text string. For example, a text string can include the text "Customer states the vehicle has [insert customer complaint]." The text within the square brackets (i.e., [ ]) identifies meta-data or a taxonomy term to be inserted to complete the text string. The portion of a text string within the square brackets can be referred to as a "text string gap" or more simply, "a gap." Processor 204 can select the meta-data or the taxonomy term based on information included on an original RO pertaining to RO ID 3915 received at VRD system 102. The text string "Please diagnose and advise" is an example of a text string without any gaps in which text is to be inserted to complete the text string. The term "MAF sensor" in the text string "Customer states please replace the MAF sensor" can be selected by processor to insert into the text string from meta-data 612.

Auto-generated repair-hint 610 can include one or more text strings from text strings 228. As an example, each sentence within auto-generated repair-hint 610 can be a separate text string. For example, a text string can include the text "Technician scan tested and verified the DTC [insert first Pcode] and DTC [insert second Pcode]." Processor 204 can select the DTC (e.g., Pcode) identifiers "P0171" and "P0174" from meta-data 612 to complete the text string by inserting those DTC (e.g., Pcode) identifiers into the text string gaps. Processor 204 can select the meta-data based on information, such as a LOC, included on an original RO pertaining to RO ID 3915 received at VRD system 102.

As another example, a text string can include multiple sentences within auto-generated repair-hint 610, such as all of the sentences, but the first sentence, within auto-generated repair-hint 610. Processor 204 can select fuel pump pressure readings (e.g., 30 and 40) to insert within the second sentence of that text string, and to select a component name (e.g., MAF sensor) from meta-data 612 or taxonomy term database 216 to insert in the $4^{th}$ through $9^{th}$ sentences of the multiple-sentence text string. Those inserted terms are underlined within FIG. 6.

Meta-data 612 can be stored with presentable RO 600 within RO 214. Additionally or alternatively, meta-data 612 can be stored within meta-data 222 along with a tag or reference to presentable RO 600.

Usage indicator 614 indicates a distance in miles associated with RO 600. Usage indicator 614 can be used by processor 204 to determine whether to select auto-generated repair-hint 610 when searching for a repair-hint based on a set of search terms.

Figure 3:
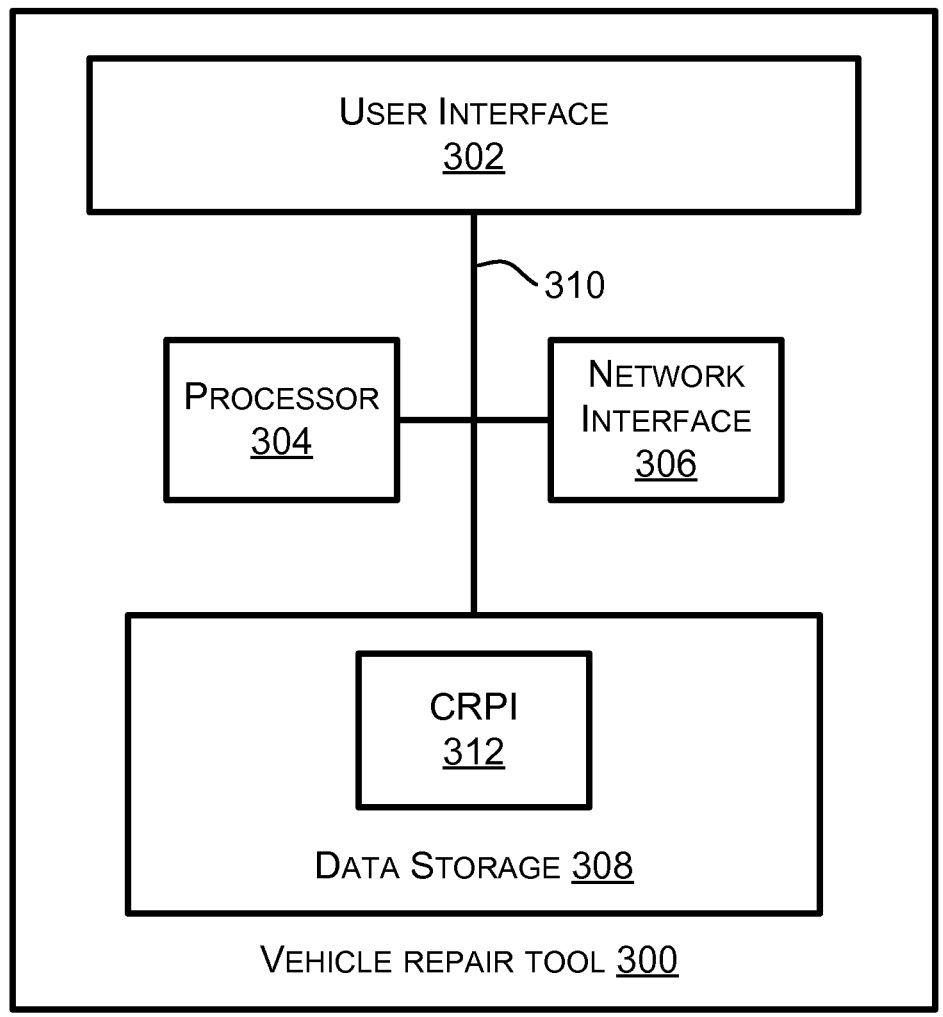
FIG. 3 is a block diagram showing a vehicle repair tool in accordance with one or more example embodiments.

Next, FIG. 3 is a block diagram showing details of example a vehicle repair tool (VRT) 300. VRT 300 is a machine. VRT 300 includes a user interface 302, a processor 304, a network interface 306, and a data storage device 308, all of which can be linked together via a system bus, network, or other connection mechanism 310. One or more of the VRT shown in FIG. 1 can be arranged like VRT 300. VRT 300 can be used within system 100 like any of the VRT shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The or each non-transitory computer-readable storage medium can include volatile or non-volatile storage components, such as optical, magnetic, organic or other memory or disc storage, which can be integrated in whole or in part with a processor 304.

User interface 302 can include an interface to components that are configured to enter data or information into VRT 300 or to components that are configured to present data or information output by VRT 300. Any of those components can be referred to as a VRT user interface component. User interface 302 can include one or more audio/visual ports or communication ports that connect to a VRT user interface component by a wired or wireless user interface communication link. Data or information entered into VRT 300 by user interface 302 can include data or information for preparing an RO, such as original RO 400.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into VRT 300 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, such as original RO 400, based on data input by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC), such as a DTC 117, as identified in section 428 of original RO 400. CRPI 312 can include program instructions for (i) displaying, by user interface 302, vehicle-ID attributes selectable to form a set of search terms, symptom criterion selectable to form part of the set of search terms, and a field for entering a usage indicator. (ii) receiving a selection of the set of search terms, (iii) providing the selected set of search terms to network interface 306 for transmission of the selected search terms to VRD system 102, (iv) receiving, by network interface 306, a repair hint, such as an auto-generated repair-hint, from VRD system 102, and (v) displaying the received repair hint using user interface 302.

A VRT, such as VRT 300 or any of the VRT shown in FIG. 1, can include, or be configured as, a smartphone, a tablet device, a laptop computer, a desktop computer, or an embedded computing device, such as the VERDICT™ Diagnostic and Information System and the VERSUS® PRO Integrated Diagnostic and Information System, both of which are available from Snap-on Incorporated, Kenosha, Wis. Accordingly, a VRT can also include computer-readable program instructions to perform features such as, but not limited to, guided component tests, an online expert forum, electrical measurements, waveform capture, displaying vehicle records, etc.

III. Example Operation

Figure 5:
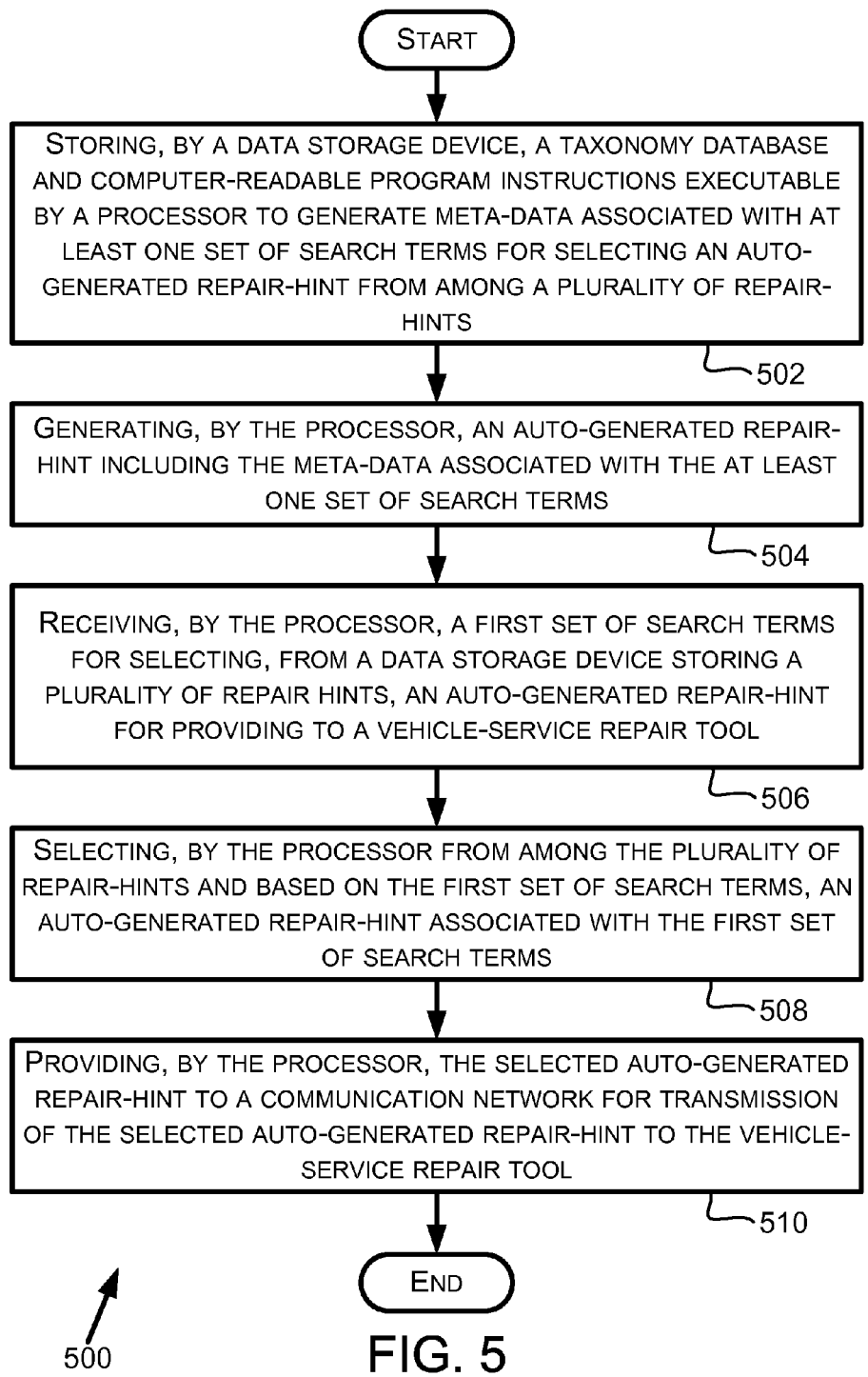
FIG. 5 is a flowchart depicting a set of functions that can be carried out in accordance with one or more example embodiments.

FIG. 5 is a flowchart depicting a set of functions 500 (or more simply "the set 500") that can be carried out in accordance with one or more example embodiments described herein. The set 500 includes the functions shown in blocks labeled with even numbers 502 through 510, inclusive. A variety of methods can be performed using one or more of the functions shown in set 500 and one or more other functions described herein. Reference numbers included within the description of FIG. 5 are provided as examples, rather than to limit the description to only the particular configuration(s) including the components associated with the reference numbers.

Block 502 includes storing, by a data storage device 210, a taxonomy term database 216, and computer-readable program instructions 218 executable by a processor 204 to generate meta-data 612 associated with at least one set of search terms for selecting an auto-generated repair-hint from among a plurality of repair hints 220.

Taxonomy term database 216 can be modified to include an additional taxonomy term entered by user interface 206. For example, processor 204 can determine that a search term entered for searching for a repair-hint does not match any term within taxonomy term database (i.e., an un-matching search term) and store the un-matching search term and a count of how many times the un-matching search terms has been entered to search for a repair-hint. Processor 204 can correlate a subsequently-entered search term that matches a search term within taxonomy term database 216 with the un-matching search term, such that if the un-matching search term is entered again to search for a repair hint, the previously un-matching search term now matches a search term within taxonomy term database 216. Processor 204 can be configured correlated the subsequently-entered search term in response to determining the count of how many times the un-matching search terms has been entered to search for a repair-hint exceeds a threshold number, e.g., 10, 20, or some other number. Additionally, data storage device 210 can receive data for modifying taxonomy term database 216 based on a human, using VRD system 102, reviewing at least a portion of the taxonomy term database 216 or an un-matching search term.

Next, block 504 includes generating, by the processor 204, an auto-generated repair-hint 610 including the meta-data 612 associated with the at least one set of search terms. Processor 204 can execute CRPI 218 to generate auto-generated repair-hints. FIG. 7 shows a set of example functions that can be carried out to generate an auto-generated repair-hint. Details pertaining to FIG. 7 follow this description pertaining to FIG. 5.

Generating auto-generated repair-hint 610 can include associating the repair-hint with a usage indicator, such as usage indicator 614. The associated usage indicator can be used to select the auto-generated repair hint 610 if the search terms include a usage indicator or range matching or including usage indicator 614.

Next, block 506 includes receiving, by the processor 204, a first set of search terms for selecting, from a data storage device 210 storing a plurality of repair hints 220, an auto-generated repair hint 610 for providing to a vehicle repair tool 114 or 116. As an example, the first set of search terms can include vehicle-ID search terms, such as a Y/M/M/E attributes (e.g., 1997/Ford/Crown Victoria/4.6 L, V8, VIN W), a system (Sys) attribute (e.g., MAF sensor), and a DTC search term (e.g., P0171 and P0174). Other examples of the vehicle-ID search term(s) (such as the Y/M/M/S/E attributes or the Y/M/M/E/Sys attributes) within the first set of search terms are also possible. The DTC search term is an example of a symptom criterion 234. Receiving the first set of search terms can include network interface 208 receiving the first set of search terms from network 104 and providing the received first set of search terms to processor 204 by connection mechanism 212.

Receiving the first set of search terms can include receiving standard search terms (SST) as described above with respect to table 5. In one respect the standard set of terms can be received by network interface 208 from a vehicle repair tool (e.g., VRT 108) over network 104, and then provided to processor 204. In another respect, the VRT can send a non-standard search terms (NSST) as described above with respect to table 5 to network interface 208 over network 104. The processor 204 can search for and receive standard search terms associated with the NSST from taxonomy term database 216 or search terms 230.

Each auto-generated repair-hint stored in the data storage device 210 (e.g., within repair hints 220) can include metadata that is associated with at least one set of search terms that is generated based on computer-readable repair-order data and computer-readable taxonomy terms within a taxonomy term database 216.

In order to receive the first set of search terms, processor 204 can provide to communication network 104, by network interface 208, a pick list from which at least a portion of the first set of search terms can be selected. Communication network 104 can carry the pick list to a VRT, such as VRT 114 or 116. Receiving the first set of search terms can include receiving the at least a portion of the first set of search terms selected from the pick list using the VRT.

The first set of search terms can include a usage indicator, such as a vehicle-usage indicator. The vehicle-usage indicator can indicate a distance, such as miles or kilometers a vehicle has been driven, or a time, such as hours a vehicle been used. Other examples of the usage indicator, such as a number of times a vehicle has been driven (i.e., vehicle-drives) or a number of times an engine has been started (i.e., engine-starts), are also possible.

Next, block 508 includes selecting, by the processor 204 from among the plurality of repair-hints 220 and based on the first set of search terms, an auto-generated repair-hint 610 associated with the first set of search terms. Processor 204 can execute CRPI 218 to search RO 214 to identify that RO cluster ID 18 includes attributes that match the DTC search term of the first set of search terms and the component search term.

In performing a search with respect to block 506 and with reference to Table 1 above, processor 204 can determine that the RO cluster IDs 1 to 17, 19, 20, and 22-25 do not have a DTC attribute that matches the DTC search term of the first set of search terms, and that the DTC attributes of RO cluster IDs 18 and 21 do match the DTC search term of the first set of search terms. In performing the search with respect to block 506, processor 204 can determine that the component attribute of RO cluster ID 21 (i.e., Fuel Filter) does not match the component search term of the first set of search terms, and processor 204 can determine that the component attribute of RO cluster ID 18 (i.e., Mass Airflow Sensor) matches the component search term of the first set of search terms. In response to those searches, processor 204 can select RO cluster ID 18 for further searching.

In performing the search with respect to block 506 and with reference to Table 2, processor 204 can determine that RO ID 3915 has Y/M/M/E attributes that match the Y/M/M/E attributes of the vehicle-ID search terms of the first set of search terms. In response to that determination, processor 204 can select RO ID 3915 or auto-generated repair-hint 610 included on the selected RO ID 3915.

In a first case, the selected auto-generated repair-hint includes one auto-generated repair-hint. For this first case, only one auto-generated repair-hint may be selected because only one auto-generated repair-hint has attributes associated with the first set of search terms received by processor 204. Typically, as the quantity of search terms within the first set of search terms increases, the number of auto-generated repair-hints that matches the first set of search terms decreases. Additionally or alternatively, only one auto-generated repair-hint may be selected because a quantity of RO less than a threshold number of RO (e.g., 25 RO) is associated with any other auto-generated repair-hint that matches the first set of search terms.

In a second case, the selected auto-generated repair-hint includes multiple auto-generated repair-hints. Selecting each auto-generated repair-hint of the multiple auto-generated repair-hints can include selecting the auto-generated repair-hint based on a quantity of computer-readable ROs associated with the auto-generated repair-hint. For example, each of the auto-generated repair-hints selected at block 506 can include an auto-generated repair-hint that is associated with search terms matching the first set of search terms and has more than the threshold number of RO associated with the auto-generated repair-hint. Data matching a portion of the first set of search terms can be used to search vehicle leverage data 224 or parts leverage data 226 to locate additional attributes that can be added to the search terms in order to increase a number of auto-generated repair-hints matching the set of search terms.

As indicated above and with reference to Table 2, RO cluster ID 18 was identified as matching the first set of search terms because the DTC attribute and component attribute matched the first set of search terms. RO cluster ID 18 is associated with an action attribute referred to as "Replaced." Other action attributes that may be associated with an RO cluster ID include, but are not limited to, adjusted, cleaned, diagnosed, inspected, and lubricated. Another RO cluster ID (e.g., RO cluster ID 26 (not shown)) can be associated with the same DTC and component attributes as RO cluster ID 18, but the action attribute is "Inspected" instead of "Replaced." If the first set of search terms does not include an action search term, then the selected auto-generated repair-hints can include auto-generated repair-hint 610 and an auto-generated repair-hint associated with RO cluster ID 26.

For embodiments in which a set of search terms, such as the first set of search terms, is received for selecting an auto-generated repair-hint and includes a usage indicator, such as a vehicle-usage indicator, selecting of the auto-generated repair-hint can be conditioned on the received usage indicator. The selected auto-generated repair-hint can be a repair hint based on a set of RO including RO data that matches the set of search terms include RO data that matches search terms, such as Y/M/M/E attributes, and RO data that matches or is within a range of the usage indicator. The RO data that matches the search terms, such as Y/M/M/E attributes can include RO data from RO including Y/M/M/E attributes obtained from vehicle leverage data 224 or parts attributes obtained from parts leverage data 226.

As an example, a set of search terms for selecting an auto-generated repair-hint can include a usage indicator, such as 25,000 miles or a usage indicator range, such as 0-25,000 miles 20,000 to 30,000 miles, 20,000 miles±5,000 miles or some other usage indicator range. A usage indicator range can be explicit, such as 20,000 to 30,000 miles or implicit, such as 25,000 miles where processor is configured to add a distance (e.g., a number of miles) to the provided value (i.e., 25,000 miles) to determine an upper boundary of the usage indicator range and to subtract a number of miles to the provided value to determine a lower boundary of the usage indicator range.

Processor 204 can be configured to search for and select an auto-generated repair-hint that matches the set of search terms and matches the usage indicator or is associated with a usage indicator that is within a usage range associated with the usage indicator of the set of search terms.

Next, block 510 includes providing, by the processor 204, the selected auto-generated repair-hint 602 to a communication network 104 for transmission of the selected auto-generated repair-hint 602 to the vehicle repair tool 114 or 116. Processor 204 can provide or cause another component of VRD system 200 (e.g., data storage device 210) to provide the selected auto-generated repair-hint 602 to network interface 208 over connection mechanism 212. Providing the selected auto-generated repair-hint 602 to communication network 104 can include network interface 208 transmitting auto-generated repair-hint 602 onto communication network 104.

A variety of methods including one or more other functions were discussed above with respect to the set 500. The following discussion prior to the discussion of FIG. 7 provides examples of the one or more other functions. Each of these examples is referred to as "another function related to the set 500," or "other functions related to the set 500."

Another function related to the set 500 includes providing, by the processor 204, at least one statistic associated with the selected auto-generated repair-hint 610 to the communication network for transmission of the at least one statistic to the vehicle repair tool 114 or 116. As an example, the at least one statistic associated with the selected auto-generated repair-hint is based on a ratio of a number of computer-readable repair orders associated with the first set of search terms and a number of computer-readable repair orders associated with a vehicle Y/M/M attribute combination. As another example, the at least one statistic associated with the selected auto-generated repair-hint pertains to geographical locations at which computer-readable repair orders associated with the first set of search terms were produced.

Another function related to the set 500 includes providing, by the processor 204, data that indicates a ranking of the multiple auto-generated repair-hints to the communication network 104 for transmission of the data to a vehicle repair tool (e.g., 114 or 116). The ranking data can indicate, for each selected auto-generate repair-hint, a probability of an occurrence of a vehicle symptom associated with each selected auto-generated repair-hint.

The set 500, or a portion of the set 500, can be repeated by the same or another VRT and VRD system 102 using a set of search terms the same as or different than the first set of search terms.

FIG. 7 is a flowchart depicting a set of functions 700 (or more simply "the set 700") that can be carried out in accordance with one or more example embodiments described herein. The set 700 includes the functions shown in blocks labeled with even numbers 702 through 712, inclusive. A variety of methods can be performed using one or more of the functions shown in set 700 and one or more other functions described herein. Reference numbers included within the description of FIG. 7 are provided as examples, rather than to limit the description to only the particular configuration(s) including the components associated with the reference numbers.

Block 702 includes identifying, by the processor 204, repair-hint attributes on an original repair order (RO) 400. The repair-hint attributes can be referred to as RO attributes. Processor 204 can execute CRPI 218 to identify service procedure information within RO sections 424, 426, and 428. Processor 204 can identify repair-hint attributes within service procedure information 418 that is within RO section 424.

Those repair-hint attributes can include, but are not limited to, the DTC numbers (P0171 and P0174), the LOC (C45, C117, C245, C772, C415, R550), the fuel pressure readings (30 PSI and 40 PSI), and the text terms within RO section 424. A text term within RO section 424 can be identified as a repair-hint attribute if the text term matches a taxonomy term within taxonomy term database 216.

Next, block 704 includes selecting, by the processor 204, taxonomy terms based on terms on the original RO 400. The selected terms can include terms within RO section 424. As an example, processor 204 can select a taxonomy term "Mass Air Flow Sensor" or "MAF sensor" for each instance of the term "MAF" within RO section 424. Processor 204 can use other information in RO section 204 (such as a DTC number or a LOC) to confirm that MAF refers to the selected taxonomy term rather than another taxonomy term. As another example, processor 204 can select a taxonomy term "fuel pump pressure" based on RO section 424 stating "fuel pressures 30/40 PSI" and an LOC. LOC C245 can, for example, represent a labor operation pertaining to testing fuel pressure of a fuel pump. Processor 204 can select the taxonomy terms from taxonomy term database 216.

Processor 204 can execute CRPI 218 to generate presentable RO 600. Processor 204 can select an un-used RO identifier each time it generates a new presentable RO. Processor 204 can obtain data for generating RO timing information 604 from date of service identifier 404. Processor 204 can obtain data for generating RO vehicle identifier 606 from vehicle information 408 and VIN 432. Processor 204 can obtain data for generating vehicle service request 608 from vehicle service request 410 and 412 and from RO section 424. Processor 204 can select a text string from text strings 228, such as the text string "Customer states the vehicle has [insert customer complaint]." Processor 204 can identify a taxonomy term "failed state emission certification" based on vehicle service request 410 to insert into the selected text string. The inserted taxonomy term "failed state emission certification" can be included as part of meta-data 612.

Next, block 706 includes generating, by the processor 204, meta-data to associate with a presentable RO 600. Processor 204 can execute CRPI 218 to generate meta-data 612. Generating meta-data associated with an RO, such as presentable RO 600, can include generating meta-data tags associated with meta-data stored within meta-data 222. Storing multiple instances of a meta-data tag for multiple presentable RO may take less data storage resources than storing multiple instances of the meta-data for the multiple presentable RO. The meta-data generated at block 706 can represent or include the taxonomy terms selected at block 704. The generated meta-data can be used for generating an auto-generated repair-hint for presentable RO 600. The generated meta-data can be used to locate a presentable RO during a search for RO or auto-generated repair-hints. For example, a set of search terms can be compared to the meta-data. If the meta-data matches the set of search terms, the presentable RO or an auto-generated repair-hint on the presentable RO can be responsively selected.

Next, block 708 includes selecting, by the processor 204, a text string for generating an auto-generated repair-hint associated 610 with a presentable RO 600. Processor 204 can execute CRPI 218 to select the text string. Processor 204 can select the text string based on the meta-data 612 and other information within RO section 224 and on RO 400. For example, processor 204 can determine that two DTC are identified in RO section 224 and select the following text string "Technician scan tested and verified the DTC [insert first DTC] and [insert second DTC]." That selected text string includes two bracketed insertion points to inset DTC P0171 and P0174 located within RO section 224. An auto-generated repair-hint can include a repair-hint that is generated by processor 204 and provided to communication network 104 for transmission to a VRT prior to a human sees or reviews the repair-hint.

Next, block 710 includes inserting, by the processor 204, the meta-data associated with the RO into the selected text string. Processor 204 can execute CRPI 218 to insert the meta-data into a gap (shown by bracketed text in the text string above) within the selected text string. Processor 204 can determine that the Pcodes of meta-data 612 can be inserted into an insert DTC gap within a text string. Processor 204 can determine that a component name of meta-data 612 can be inserted into a [insert component name] gap within a text string.

Next, block 712 includes storing, by data storage device 210, the auto-generated repair-hint 610 and the meta-data 612 associated with the presentable RO 600. Processor 204 can execute CRPI 218 to cause data storage device 210 to store auto-generated repair-hint 610 and the meta-data 612.

IV. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a non-transitory computer-readable medium storing program instructions, that when executed by a processor of a machine cause a set of functions to be performed, the set of functions comprising the features or functions of the aspects and embodiments described herein.

I claim:

1. A method comprising:
receiving, by a processor, a first set of search terms for selecting, from a non-transitory data storage device storing a plurality of repair-hints, an auto-generated repair-hint for providing to a vehicle repair tool, wherein each auto-generated repair-hint stored in the data storage device includes meta-data that is associated with at least one set of search terms and the meta-data is generated based on computer-readable repair-order data and computer-readable taxonomy terms within a taxonomy term database;
selecting, by the processor from among the plurality of repair-hints and based on the first set of search terms, an auto-generated repair-hint associated with the first set of search terms; and
providing, by the processor, the selected auto-generated repair-hint to a communication network for transmission of the selected auto-generated repair-hint to the vehicle repair tool.

2. The method of claim 1,
wherein the selected auto-generated repair-hint includes multiple auto-generated repair-hints, and
wherein selecting each auto-generated repair-hint of the multiple auto-generated repair-hints includes selecting the auto-generated repair-hint based on a quantity of computer-readable repair orders associated with the auto-generated repair-hint.

3. The method of claim 2, further comprising:
providing, by the processor, data that indicates a ranking of the multiple auto-generated repair-hints to the communication network for transmission of the data to the vehicle repair tool,
wherein the ranking data indicates, for each selected auto-generated repair-hint, a probability of an occurrence of a vehicle symptom associated with the each selected auto-generated repair-hint.

4. The method of claim 1, further comprising:
storing, by the data storage device, the taxonomy term database and computer-readable program instructions,
wherein the computer-readable program instructions include program instructions executable by the processor to generate, for each auto-generated repair-hint and based on computer-readable repair orders stored by the data storage device, the meta-data associated with the at least one set of search terms,
wherein the taxonomy term database includes a plurality of taxonomy terms for comparison to terms on the computer-readable repairs orders, and
wherein at least a portion of the meta-data associated with the at least one set of search terms for each auto-generated repair-hint includes a taxonomy term selected from the taxonomy term database.

5. The method of claim 4, further comprising:
storing, by the data storage device, text strings having gaps for inserting the meta-data that is associated with the at least one set of search terms;
selecting, by the processor, at least one text string associated with the first set of search terms; and
inserting, by processor, the meta-data of the selected auto-generated repair-hint into the selected at least one text string associated with the first set of search terms,
wherein selecting the auto-generated repair-hint includes selecting the at least one text string associated with the first set of search terms and the inserted meta-data.

6. The method of claim 1, further comprising:
storing, by the data storage device, a plurality of vehicle-year-make-model attribute combinations and a plurality of symptom-criterions, wherein the first set of search terms includes (i) a first vehicle-year-make-model attribute combination among the plurality of vehicle-year-make-model attribute combinations, and (ii) a first symptom-criterion among the plurality of symptom-criterions,
wherein each set of search terms associated with the meta-data of a repair-hint includes a vehicle-year-make-model attribute combination among the plurality of vehicle-year-make-model attribute combinations and a symptom-criterion among the plurality of symptom-criterions.

7. The method of claim 6, further comprising:
providing, by the processor, at least one statistic associated with the selected auto-generated repair-hint to the communication network for transmission of the at least one statistic to the vehicle repair tool.

8. The method of claim 7, wherein the at least one statistic associated with the selected auto-generated repair-hint is based on a ratio of a number of computer-readable repair orders associated with the first set of search terms and a number of computer-readable repair orders associated with the first vehicle-year-make-model attribute combination.

9. The method of claim 7, wherein the at least one statistic associated with the selected auto-generated repair-hint pertains to geographical locations at which computer-readable repair orders associated with the first set of search terms were produced.

10. The method of claim 6, wherein at least one vehicle-year-make-model attribute combination includes a vehicle-year-make-model-submodel-engine attribute combination.

11. The method of claim 1, wherein the auto-generated repair-hint associated with the first set of search terms includes computer-readable data identifying a way to stop a vehicle component from rattling.

12. The method of claim 1, further comprising:
generating, by the processor, the selected auto-generated repair-hint.

13. The method of claim 1, wherein at least one repair-hint of the plurality of repair-hints includes meta-data associated with at least two sets of search terms.

14. The method of claim 1, further comprising:
providing, by the processor to the communication network for transmission to the vehicle repair tool, a pick list from which at least a portion of the first set of search terms can be selected,
wherein receiving the first set of search terms includes receiving the at least a portion of the first set of search terms selected from the pick list.

15. The method of claim 1, further comprising:
receiving, by the data storage device, data for modifying the taxonomy term database based on a human reviewing at least a portion of the taxonomy term database.

16. The method of claim 1, further comprising:
storing, by the data storage device, a plurality of vehicle-year-make-model-system attribute combinations and a plurality of symptom-criterions, wherein the first set of search terms includes (i) a first vehicle-year-make-model-system attribute combination among the plurality of vehicle-year-make-model-system attribute combinations, and (ii) a first symptom-criterion among the plurality of symptom-criterions,
wherein each set of search terms associated with the meta-data of a repair-hint includes a vehicle-year-make-model-system attribute combination among the plurality of vehicle-year-make-model-system attribute combinations and a symptom-criterion among the plurality of symptom-criterions.

17. The method of claim 1, further comprising:
generating, by the processor, the selected auto-generated repair-hint; and
receiving, by the processor, a vehicle-usage indicator,
wherein selecting the auto-generated repair-hint is conditioned on the received vehicle-usage indicator, and
wherein generating the selected auto-generated repair-hint is based on a set of computer-repair orders including first repair order data that matches the first set of search terms and second repair order data that matches or is within a range associated with the received vehicle usage indicator.

18. The method of claim 17, wherein the vehicle-usage indicator indicates a distance, a distance range, an amount of time, an amount of time range, a number of engine-starts, an engine-starts range, a number of vehicle-drives, or a vehicle-drives range.

19. The method of claim 1, further comprising:
accessing, by the processor, leverage data to add at least one additional search term, based on leverage data associated with at least a portion of the first set of search terms, to the first set of search terms,
wherein selecting the auto-generated repair-hint associated with the first set of search terms includes selecting the auto-generated repair-hint associated with the first set of search terms including the at least one additional search term.

20. A machine comprising:
a non-transitory data storage device storing a plurality of auto-generated repair-hints, wherein each auto-generated repair-hint stored in the data storage device includes meta-data that is associated with at least one set of search terms and the meta-data is generated based on computer-readable repair-order data and computer-readable taxonomy terms within a taxonomy term database;
a processor configured to receive a first set of search terms for selecting, from the data storage device, an auto-generated repair-hint for providing to a vehicle repair tool; and
a network interface configured to transmit the auto-generated repair-hint selected by the processor to a communication network for transmission of the selected auto-generated repair-hint to the vehicle repair tool.

21. The machine of claim 20,
wherein the data storage device stores a first text string with a first gap for inserting first meta-data, and
wherein the data storage device stores computer-readable program instructions executable by the processor to select the first text string including the first gap and the first meta-data to insert into the first gap to generate the selected auto-generated repair-hint.

22. The machine of claim 21, wherein the first set of search terms includes a vehicle year attribute, a vehicle make attribute, a vehicle model attribute, a vehicle engine attribute, and a vehicle symptom criterion.

23. A machine comprising:
a non-transitory data storage device storing computer-readable program instructions;
a processor configured to execute the program instructions stored in the data storage device to generate a repair-hint request including a set of search terms;
a network interface configured to transmit over a communication network the repair-hint request including the set of search terms and to receive an auto-generated repair-hint that includes meta-data that is associated with at the set of search terms and the meta-data is generated based on computer-readable repair-order data and computer-readable taxonomy terms within a taxonomy term database; and
a display device to display the auto-generated repair-hint received by the network interface.

24. The machine of claim 23, wherein the first set of search terms comprises a set of standard search terms or a set of non-standard search terms.

* * * * *